Aug. 11, 1964

M. H. KITTELSON 3,144,220

CONTROL APPARATUS

Filed Feb. 23, 1962

INVENTOR.
MATHIAS H. KITTELSON
BY
Carlsen & Carlsen
ATTORNEYS

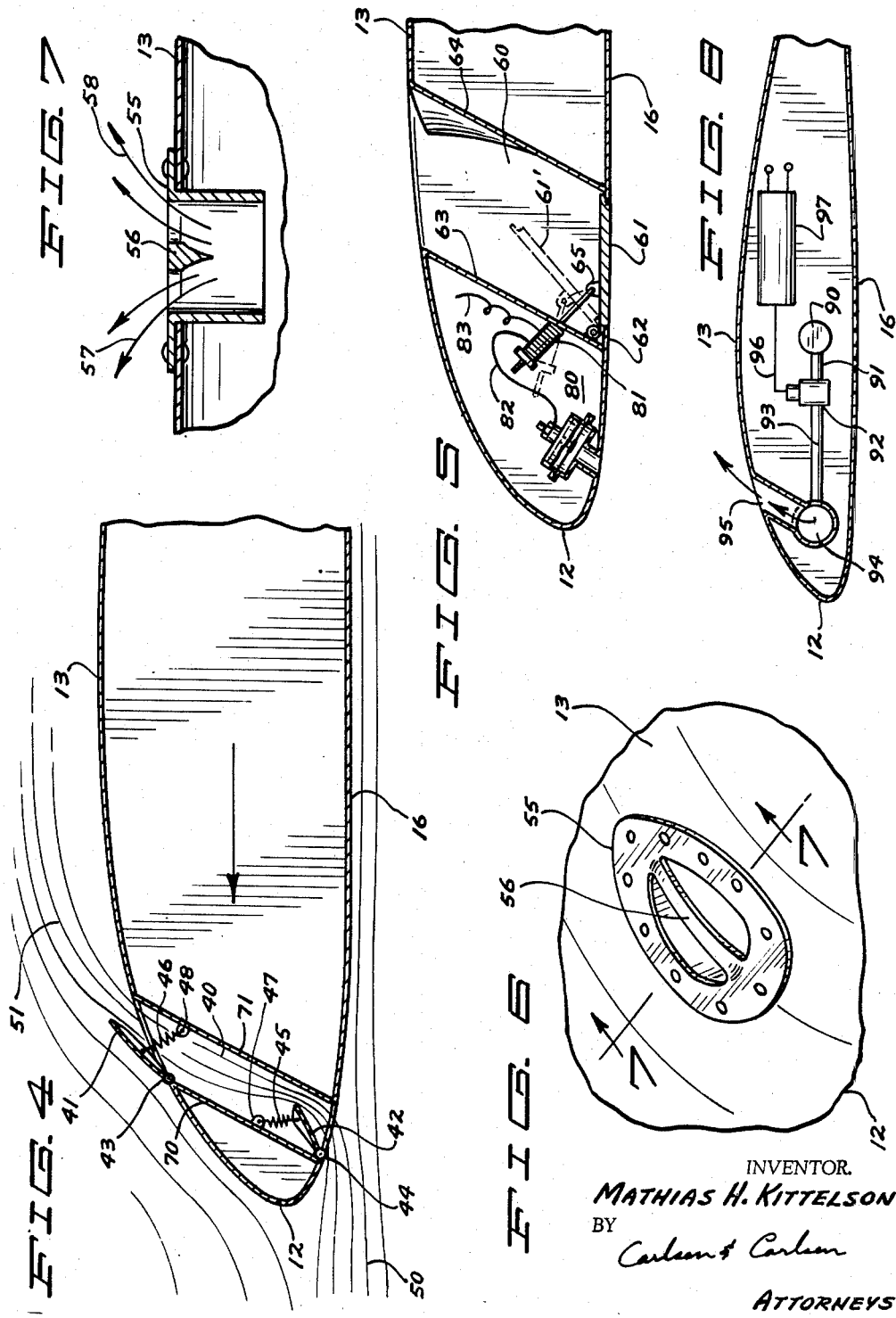

United States Patent Office

3,144,220
Patented Aug. 11, 1964

3,144,220
CONTROL APPARATUS
Mathias H. Kittelson, 4606 Casco Ave.,
Minneapolis, Minn.
Filed Feb. 23, 1962, Ser. No. 174,963
6 Claims. (Cl. 244—42)

This invention relates generally to automatic control devices and systems for use in the operation of fluid borne craft and is more particularly directed to such crafts that depend upon the lifting force provided by a fluidfoil due to the pressure differential which may exist by virtue of relative movement between the fluidfoil and the fluid in which the craft is to be operated.

The present state of the art includes a number of applications of fluidfoils used in one manner or another to provide a lifting force for a craft. All that is necessary for proper operation is suitable connection of the fluidfoil member or members to a craft and some means for providing relative movement between the fluidfoil and the fluid in which the craft is to be operated. One example of such an application is the aircraft, in which a pair of wings and other supporting surfaces having an airfoil configuration, relies upon the lifting force generated by forward motion of the aircraft through the air as provided by various forms of propulsion apparatus. Another example is the helicopter in which a rotor assembly is made up of a number of blades having the shape of an airfoil and the assembly is caused to rotate with respect to the fluid air to provide a lifting force and, in some cases, through suitable mechanism, a forward propulsion force. A further example of the application of fluidfoil is the use in connection with water borne craft in which devices known as hydrofoils are utilized to provide a lifting force so as to reduce the total area of the boat in contact with the water when forward propulsion force is supplied to provide relative motion between the hydrofoil lifting members and the fluid water. In all of the above mentioned examples, the fluidfoil members providing the lifting force are subject to certain stresses and strains and accordingly must be constructed of suitable materials so as to withstand the maximum stress and strain which might be expected in normal and abnormal operating conditions. For example, the forces to which an airplane wing may be subjected to in flight in ordinary quiet air are substantially less than have been experienced in moving air and particularly in highly turbulent air in which transient forces greatly exceed the normal force necessary to provide adequate lifting force to support the craft to which the fluidfoil is attached. Further, experience has determined that the transient forces encountered under such conditions are not such that simultaneous application to both wings of an aircraft could be expected. This, of course, results in sometimes severe buffeting and uncontrollable rapid changes in attitude of the craft about its axes of control.

The present invention is directed to providing an automatically operative apparatus for controlling the application of the unexpected and undesirable transient forces which may be encountered and reducing the effect of such forces to a minimum value. By so doing the controlability of a craft utilizing these features of my invention would be materially enhanced under operating conditions wherein transient forces of an undesirable nature are encountered. This, of course, would contribute materially also to a comfort of human passengers in such a craft. Equally as important is the fact that my providing for automatic relief, or compensating for the transient forces, the fluidfoil members may be designed for a considerably lessened maximum strength which will allow for a reduction in weight and a further possible reduction in overall size. These two factors provide an automatic increase in the total load which might be carried by a craft and, by reducing the fluid frictional forces, may also provide an increased speed of operation.

In applying these principles of my invention to a fluidfoil member, a plurality of openings are positioned within the upper area of a fluidfoil member which the lowest pressure is normally encountered on relative movement between the member and a fluid. Each of the openings may be automatically supplied with suitable amounts of the fluid when the pressure differential between the upper and lower surface of the fluidfoil member exceeds a predetermined value. A force sensing mechanism may also be used to respond to a force, exceeding a predetermined value, upon the lower surface of the fluidfoil member. By introducing suitable amounts of fluid into the area of low pressure on the upper surface the pressure differential is decreased and the lifting force upon the fluidfoil member by the fluid may be reduced by an amount necessitated by the requirements of the particular installation.

It is therefore an object of the present invention to provide an automatic apparatus for reducing the forces to which a fluidfoil craft supporting member may be subjected.

It is a further object of the present invention to provide automatic apparatus and means for reducing the lift force of at least a portion of a fluidfoil member when such force exceeds a predetermined value.

It is another object of the present invention to provide automatic force relieving apparatus positioned at predetermined locations along the leading edge of a fluidfoil member, each of which may be actuated to provide a lift force reducing operation in response to transient forces exceeding a predetermined value.

Another object of this invention is to provide means automatically responsive to pressure ratios above a predetermined value between the upper and lower portions of a fluidfoil member to reduce such pressure ratio to a predetermined value through the addition of fluid to an area on the upper surface of the fluidfoil member.

It is another object of the present invention to provide means for introducing such fluid to the upper surface of a fluidfoil which is readily adaptable to present forms of such lift producing members.

These and other more detailed and specific objects will be disclosed in the course of the following specification, reference being had to the accompanying drawings, in which—

FIGS. 4 and 5 are side sectional elevational drawings of further embodiments of my invention.

FIG. 6 is a top perspective view of a device for use in carrying out the principles of my invention.

FIG. 7 is a cross sectional view taken across the section 7—7 on FIG. 6.

FIG. 8 is a cross sectional view taken across a cross section of a fluidfoil member illustrating a still further embodiment of my invention.

Figure 1:
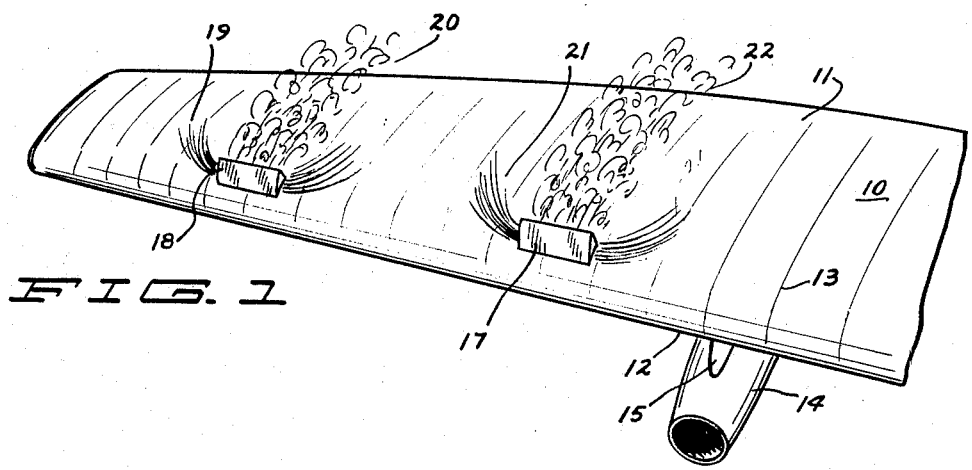
FIGS. 1 and 2 are top and bottom perspective views of an aircraft wing illustrating the operation of one embodiment of the present invention.
Figure 2:
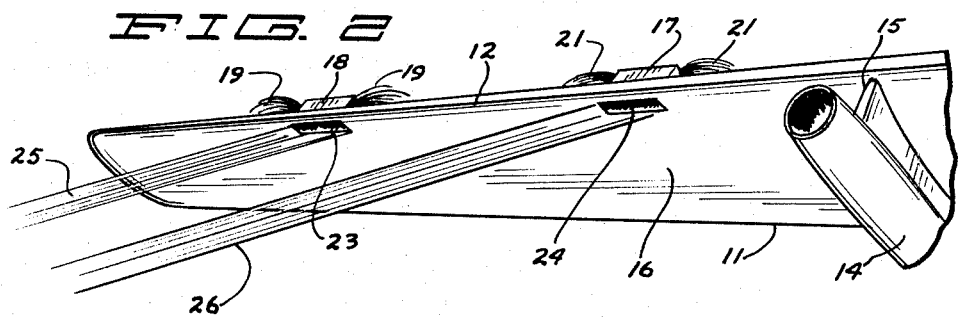
Figure 3:
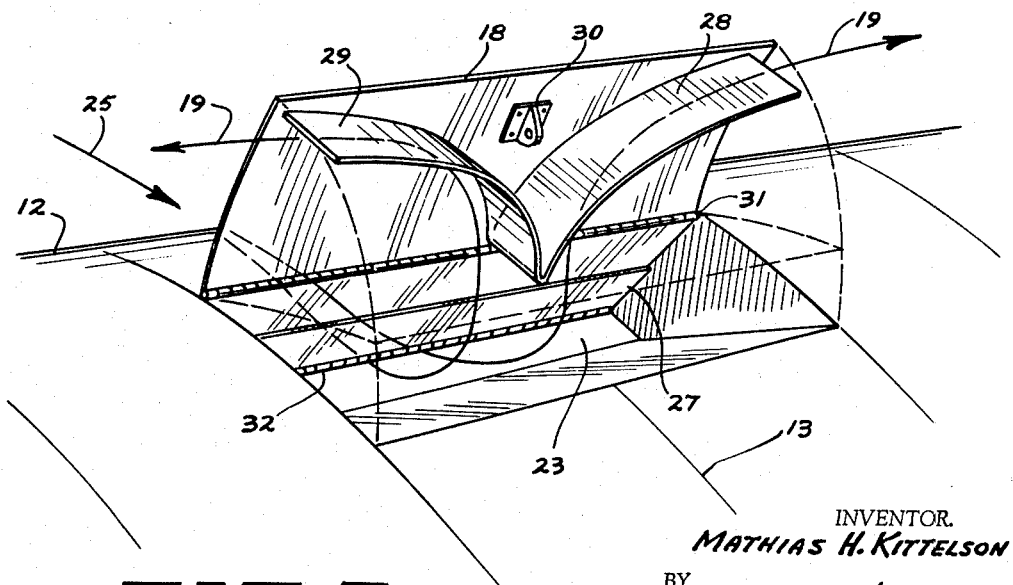
FIG. 3 is a detailed, perspective and phantom view looking forwardly from the trailing edge of the fluidfoil member showing the details of construction of portions of FIGS. 1 and 2.

Referring now to FIGS. 1, 2 and 3, there is shown a fluidfoil 10 in the form of the familiar airfoil shaped wing for an aircraft. A propulsion means 14 is suitably attached to the airfoil for providing relative motion between the fluidfoil 10 and the fluid medium through forward motion therethrough. Fluidfoil 10 includes a leading edge 12, a trailing edge 11 and upper surface 13 and a lower surface 16. It is of generally elongate shape and may have a cross sectional configuration corresponding to any one of a number of well known airfoil shapes dependent upon the fluid medium and the craft characteristics to which it is attached. Further, the fluidfoil 10 may taper about its longitudinal axis and is generally of larger size immediately adjacent the attachment point to the craft and of smaller size toward the opposite extremity. A pair of retractable covers 17 and 18 are shown positioned near the leading edge 12 of fluidfoil 10 and are adapted to be projected upwardly from the upper surface 13. A duct is provided in the fluidfoil between the members 17 and 18 so that fluid may flow through openings 24 and 23 respectively through the fluidfoil and up to the upper surface 13. The pattern of flow is indicated generally by the reference numerals 21 and 22 for member 17 and by reference numerals 19 and 20 for member 18. The lines indicated by reference numerals 26 and 25 indicate the source of fluid which may flow through openings 24 and 23 and thence to the upper surface of the fluidfoil. It is anticipated that a plurality of members constructed in a like manner as members 17 and 18 may be positioned at appropriate intervals along the forward longitudinal axis of the fluidfoil. The characteristics of the fluidfoil would, of course, be determinative of the size and number of such openings. In the embodiment of FIGS. 1, 2 and 3 it is anticipated that the cover members 17 and 18 would be positioned so as to provide a fluid flow in the area of lowest pressure, or highest lift, of the particular airfoil shape utilized. The retractable cover members will provide suitable relief from high transient lift force conditions when positioned approximately 15–20% rearwardly of the leading edge 12 of the fluidfoil. It may be noted that the extension of members 17 and 18 above the upper surface 13 of fluidfoil 10 results in fluid being released along the lines 21 and 19 respectively and a turbulent condition 22 and 20 is also provided which may aid in reducing the lift force by disturbing the laminar flow of the air across the fluidfoil. However, the addition of the fluid under pressure as indicated by the lines 25 and 26 through openings 23 and 24 respectively is believed to be the major factor in the relieving of the high transient force condition.

In FIG. 3 an enlarged view of retractable cover member 18 and portions of the apparatus associated therewith is provided. Cover member 18 is attached at its forward edge to the upper surface of the fluidfoil member 10 by hinge means 31 and is adapted to rotate thereabout. A fastening member 30 is shown attached to the lower surface of cover member 18 and is adapted to be attached to suitable operating mechanism (not shown) which may take the form of a hydraulic cylinder or other suitable actuating devices. A vein member shown in the form of a substantial V shape is comprised of elements 28 and 29 and is securely attached to the lower surface of cover member 18. As shown in the phantom outline, the position of cover member 18 when operative to provide a flow of fluid under pressure to the upper surface 13 of the fluidfoil is such that the fluid ducted to the upper surface of the wing will tend to flow along the lines indicated by the reference numerals 19 from the input or high pressure side of the wing as indicated by reference numeral 25 applied to the arrow. So as to provide a smooth surface for the lower surface of the fluidfoil 16, a member 27 is adapted to close opening 23 and is attached at its forward edge to the lower surface of the fluidfoil through hinge means 32. Member 27 may be positioned in an open or closed state by suitable actuating means (not shown).

It is anticipated that the operation of the devices illustrated in FIGS. 1, 2 and 3 may be effected simultaneously or individually through the application of control effected from suitable control apparatus. Dependent upon the particular application, suitable strain gauges may be provided to sense abnormal stresses and strains on the fluidfoil structure to actuate the lift reducing function. The pressure differential between the lower and upper surfaces of the fluidfoil may be utilized to sense abnormal high transient conditions and a pressure sensing apparatus may be utilized on the lower surface 16 of the fluidfoil 10 to actuate the apparatus. It is anticipated that suitable control systems for the operation of such devices in accordance with the principles of my invention may occur to those skilled in the art.

In FIG. 4 there is shown in cross section a further embodiment of my invention as might be installed in a fluidfoil having a leading edge 12, an upper surface 13 and a lower surface 16 and which generally travels through a fluid in a direction indicated by the arrow. A channel or conduit 40 serves to interconnect the upper and lower surfaces of the wing and is normally closed at its upper outlet extremity by a cover member 41 that is adapted to rotate about a hinge member 43. A tension spring member 46 is attached to a mounting means 48 and to the lower surface of cover 41 so as to maintain it in its normal closed condition. Likewise a cover member 42 adapted to rotate about a hinge member 44 is provided at the lower extremity of duct 40 and is normally biased in a closed position by a compression spring 45 suitably attached to mounting means 47 and to the interior surface of cover 42. The fluid stream flow when the device is operative to relieve excessive lifting forces on the fluidfoil is indicated by the reference numerals 50 and 51.

A normal operation cover members 41 and 42 would be in the retracted position so as to cover the inlet and outlet extremities of conduit or duct 40. Each of the spring biasing members 45 and 46 would be provided so as to release the respective cover members when the force exerted thereon from the pressure existing at the lower forward surface 16 of the fluidfoil, as indicated by flow lines 50, exceeded the amount necessary to overcome the biasing effect of the spring members. This would then allow fluid to pass through the duct to reduce the lift forces on the fluidfoil. It is anticipated that the spring members may be constructed so as to open and start to relieve excessive forces whenever the pressure encountered is sufficient to provide a lift force exceeding two times the force of gravity. This, of course, is a matter of degree and the exact value is determined by the nature of the application.

FIGS. 6 and 7 illustrate a novel flush mounted outlet for releasing and distributing fluid to the upper surface 13 of the fluidfoil. The exposed upward end of the outlet is indicated by reference numeral 55 on FIG. 6 and shows a member 56 extending across an oval shaped aperture. The entire assembly may be flush mounted or mounted immediately on top of the surface of the fluidfoil. In FIG. 7 the cross sectional view of a member 56 illustrates its function in dividing the flow and tending to distribute it over a large area of the upper surface of the wing 13. A fluid supplied in any of the methods suggested in other portions of this specification flows upward and outwardly as indicated by the arrows to which reference numerals 57 and 58 have been applied. This provides an outlet which does not normally interfere with the satisfactory and efficient operation of the fluidfoil but which efficiently and effectively provides a means for introducing fluid under pressure into the volume and onto the area just above the upper surface 13 of the fluidfoil.

FIG. 5 is a cross sectional view of a further embodiment of my invention as suggested above. A duct 60 comprised of forward and trailing walls 63 and 64 is positioned just aft of the leading edge 12 of a fluidfoil. The outlet at the top of the duct is shown without a movable cover and may take the form of the outlet shown in FIGS. 6 and 7 or other suitable configurations. A closure member 61 adapted to rotate about a hinge member 62 is provided to cover the inlet or lower end of conduit 60 in normal operation. Cover member 61 includes a mounting means 65 for attachment to a movable plunger actuated by a device shown by way of an example as a solenoid 81. Solenoid 81 may be energized from a suitable source of power through conductor 83 and conductor 82 which is connected to a pressure sensing means 80. Pressure sensing means 80 is provided to sense the pressure just aft of the leading edge 12 of the fluidfoil and upon the pressure exceeding a predetermined value depedent upon the characteristics of the pressure sensor 80, to close contacts causing energization of the solenoid on actuator 81. This provides movement of the cover member 61 to the position shown in phantom and indicated by reference numeral 61' to allow fluid to flow from the lower surface 16 to the upper surface 13 to reduce the force on the fluidfoil member.

A further modification is shown in FIG. 8 in cross section and consists of a source of fluid under pressure (not shown) connected to a suitable distributing manifold 90. Manifold 90 may be connected to a suitable outlet 95 through conduit 91, valve member 92, conduit 93 and distribution conduit 94. The fluid would be flowing in a direction indicated by the arrows upon energization of valve 92 to interconnect conduit 90 to conduit 94. Valve 92, which may take the form of an electric solenoid operated valve, is connected to suitable force sensing means 97 through lead 96. Force sensing means 97 is connected to a suitable source of electrical energy (not shown).

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus of the class above described, a fluid outlet comprising a cover member hingedly fastened to the forward edge of an opening in a fluidfoil and movable between a normally inoperative retracted position and an operative extended position above the upper surface of said fluidfoil; and a substantially V-shaped fluid deflector positioned on the lower surface of said member with the apex thereof positioned in a forwardly extending direction whereby the flow of fluid through said opening tends to flow in directions parallel to the longitudinal axis of said fluidfoil.

2. In apparatus of the class above described, the combination comprising; a fluidfoil of generally elongate shape and having leading and trailing edges and upper and lower surfaces; a plurality of fluid ducts interconnecting said upper and lower surfaces in proximity to said leading edge, each of said ducts having upper and lower cover members, said upper cover member having a downwardly depending fluid deflector; and actuating means for maintaining each of said cover members in a closed position when the pressure differential between said upper and lower surfaces is below a predetermined value and for allowing fluid to travel from said lower surface to said upper surface when the pressure differential between said surfaces exceeds a predetermined value.

3. In apparatus of the class above described, a fluid outlet for distributing fluid under pressure on and above the upper surface of a fluidfoil member comprised of a hingedly mounted outlet cover operable between retracted outlet covering position and upwardly extending fluid distributing position and including means for dividing fluid flow from said outlet.

4. In apparatus of the class above described, a fluid outlet comprising a cover member hingedly fastened to the forward edge of an opening in a fluidfoil and movable between a normally retracted position to form a part of the upper exterior surface of a fluidfoil and an upwardly extended position to allow fluid to flow therethrough, said cover member including a downwardly depending fluid deflecting means for diverting a substantial portion of the fluid flowing out of said outlet to the side edges of said opening whereby extension of said cover member to an operative position directs the flow of fluid out of said opening to areas of substantially laminar flow on said fluidfoil and substantially turbulent fluid flow is present in the area directly following said cover member.

5. Safety control apparatus for limiting the forces upon a fluidfoil utilized to provide a craft supporting force upon relative movement between a craft and a fluid medium comprising: a fluidfoil member of generally elongate shape, having upper and lower surfaces and trailing and leading edges; a plurality of fluid ducts intermediate the upper and lower surfaces and positioned in proximity to the leading edge of said fluidfoil; cover members for the outlets of said ducts, hingedly mounted on the forward edges of said outlets and having means for deflecting fluid laterally thereof when in an operative position to allow fluid flow through said ducts; means for extending and retracting said cover members to control the flow of fluid through said ducts and over the upper surface of said fluidfoil; and means responsive to the presence of forces upon said fluid foil above a predetermined value for energizing said last named means to extend said cover members.

6. The apparatus of claim 5 in which the means responsive to the presence of forces upon the fluidfoil is responsive to fluid pressure.

References Cited in the file of this patent
UNITED STATES PATENTS

| | | |
|---|---|---|
| 1,724,456 | Crook | Aug. 13, 1929 |
| 1,852,167 | Kinsel | Apr. 5, 1932 |
| 1,902,133 | Lavelle | Mar. 21, 1933 |
| 2,498,064 | Borell | Feb. 21, 1950 |
| 2,549,045 | Ashkenas | Apr. 17, 1951 |